United States Patent [19]

Fukuchi

[11] Patent Number: 5,652,807
[45] Date of Patent: Jul. 29, 1997

[54] SEMICONDUCTOR OPTICAL MODULATOR

[75] Inventor: Kiyoshi Fukuchi, Tokyo, Japan

[73] Assignee: NEC Corporation, Tokyo, Japan

[21] Appl. No.: 699,337

[22] Filed: Aug. 19, 1996

[30] Foreign Application Priority Data

Aug. 19, 1995 [JP] Japan ................................. 7-233361

[51] Int. Cl.⁶ .................................................. G02F 1/035
[52] U.S. Cl. ............................................................ 385/3
[58] Field of Search .............................. 385/1–5, 8, 11, 385/14, 16, 24

[56] References Cited

U.S. PATENT DOCUMENTS

| 5,185,830 | 2/1993 | Nishimoto | 385/11 |
| 5,283,842 | 2/1994 | Hakogi et al. | 385/3 |
| 5,287,421 | 2/1994 | Forrest et al. | 385/5 |
| 5,515,196 | 5/1996 | Kitajima et al. | 372/26 |
| 5,528,707 | 6/1996 | Sullivan et al. | 385/2 |
| 5,590,143 | 12/1996 | Takara et al. | 372/28 |

FOREIGN PATENT DOCUMENTS

| 5-72575 | 3/1993 | Japan . |
| 6-268316 | 9/1994 | Japan . |

OTHER PUBLICATIONS

H. Sano et al., "InGaAs/InAlAs MQW Mach–Zehnder Optical Modulator for 10–Gbit/s Long–Haul Transmission Systems", *Optical Fiber Communication Conference*, OFC '92, p. 223.

C. Rolland et al., "10 Gb/s, 120 km Normal Fiber Transmission Experiment Using a 1.56 μm Multiple . . . Modulator", *Optical Fiber Communication Conference*, OFC '93, PD27, 1993, pp. 111–114.

*Primary Examiner*—Akm E. Ullah
*Attorney, Agent, or Firm*—Sughrue, Mion, Zinn, Macpeak & Seas

[57] ABSTRACT

Disclosed is a semiconductor optical modulator which has: semiconductor input-light waveguide with an incidence end; a semiconductor Y-branch element for branching light from the semiconductor input-light waveguide into two equal lights; first and second semiconductor optical waveguides for propagating the two lights, respectively branched by the semiconductor Y-branch element; first and second electrodes provided on the first and second optical waveguides, respectively; a semiconductor optical coupling element for coupling the two lights passed through the first and second optical waveguides; and a semiconductor output-light waveguide for leading light coupled in the semiconductor optical coupling element to an emission end of the semiconductor output-light waveguide; wherein the semiconductor optical modulator is provided with a means for producing a phase difference of 180° between the two lights input to the semiconductor optical coupling element when equal voltages are applied to the first and second electrodes.

9 Claims, 14 Drawing Sheets

SEMICONDUCTOR OPTICAL MODULATOR

FIELD OF THE INVENTION

This invention relates to a semiconductor optical modulator to be used in optical fiber communication systems or the like, and more particularly to, a Mach-Zehnder type optical intensity modulator in which a semiconductor optical waveguide is employed.

BACKGROUND OF THE INVENTION

In recent high-speed optical fiber digital communication systems, the Mach-Zehnder optical modulator is typically used to modulate an optical intensity in a transmitter. With reference to FIG. 1, the operation of the Mach-Zehnder optical modulator will be explained below. Incident light into an incidence end 8 of the modulator is equally divided into two by a Y-branch element 1. The divided lights are passed through the first and second optical waveguides 2, 3, respectively and are thereafter coupled at an optical coupling element 6. Here, over the first and second optical waveguides 2, 3, the first and second electrodes 4, 5 are provided, respectively. Depending on a signal voltage applied to the electrodes, refractive indexes of the optical waveguides thereunder can be independently changed to produce a phase difference between the two lights reaching the optical coupling element 6.

If the phase difference is 0, as shown in FIG. 2A, the first light 31 passing through the first optical waveguide 2 has the same phase as the second light passing through the second optical waveguide 3 at the optical coupling element 6 to give output light 33 with the biggest power. This corresponds to a light-ON state. On the other hand, when the phase difference is 180°, as shown in FIG. 2B, the first light has the reverse phase to the second light at the optical coupling element 6. Thereby the two lights interfere with each other to make the power of the output light 33 zero. This corresponds to a light-OFF state. A Mach-Zehnder modulator generally is composed of, as shown in FIG. 1, two optical waveguides with equal lengths. In this composition, if the same potential is given to two electrodes, the phase difference is 0 to give a light-ON state, and if the potential difference of half-wavelength voltage $V_\pi$ is given between them, the phase difference is 180° to give a light-OFF state.

In optical communication, the power ratio of an ON level and an OFF level of modulated light, i.e., extinction ratio is an important factor. If the extinction ratio is small, the minimum input power necessary for a receiver to obtain a desired transmission quality must be greater, thereby shortening the transmission distance. In response to this, a modulator using lithium niobate(LiNbO₃)(hereinafter referred to as 'LN modulator') which has a high extinction ratio more than 30 dB has been developed.

Also, in the optical communication, chirping that occurs in transmitted light is an important factor. The chirping is an optical frequency shift as shown in FIGS. 3A to 3C, which occurs simultaneously when optical intensity is modulated. It is called a positive chirping in the case that, as shown in FIG. 3A, a positive frequency shift occurs when turning light-OFF to light-ON and a negative frequency shift occurs when turning light-ON to light-OFF. On the contrary, it is called a negative chirping in the case that, as shown in FIG. 3B, the reverse frequency shift occurs. In FIGS. 3A and 3B, 41 and 43 indicate output optical waveforms and 42 and 44 indicate the chirping of modulated light. When a proper chirping occurs in transmitted light, optical pulses can be compressed to be transmitted with keeping the shape over a long distance. Utilizing this, when light with a wavelength of 1.5 μm is transmitted using a fiber having zero dispersion in 1.3 μm band, the transmission distance can be lengthened by the negative chirping occurred in the transmitted light. The Mach-Zehnder modulator is a device in which the amount of chirping can be controlled by the amplitude ratio of signal voltages applied to two optical waveguides.

In general, LiNbO₃ has been used as the material for making the Mach-Zehnder modulator. Recently, a modulator made of semiconductor materials such as indium phosphide (InP) has been developed. When the semiconductor materials are employed, its phase variation per unit length of optical waveguide can be greater than that of LiNbO₃, thereby reducing the applied voltage and the device size.

In the semiconductor Mach-Zehnder modulator, only reverse bias can be applied to optical waveguides to change the optical phase. This is because forward bias causes the emission of device. Thus, the voltage waveforms applied to two electrodes when modulated are as waveforms 51(applied voltage to the first electrode) and 52(applied voltage to the second electrode) shown in FIG. 4A. Here, the chirping of modulated light can be controlled by the amplitude ratio of the two signals.

On the other hand, in the semiconductor Mach-Zehnder optical modulator, the amount of light absorbed in an optical waveguide varies depending on the voltage applied to electrodes. Namely, loss at the optical waveguide varies depending on the applied voltage. Hereinafter, it is referred to as 'loss variation'. FIG. 6 shows the loss variation to applied voltage at an optical waveguide. As shown in FIG. 6, the loss variation increases as the absolute value of the applied voltage is increased. The loss variation affects negatively to the extinction ratio and chirping of modulated light.

FIGS. 5A and 5B show optical output waveforms when light is modulated by the signals as shown in FIGS. 4B and 4C in a semiconductor optical modulator. In FIGS. 5A and 5B, 81 and 91 indicate the output light waveforms and 82 and 92 indicate the chirping of modulated light. When the modulation is conducted by the signal in FIG. 4B to occur the positive chirping, in the light-OFF state, voltages applied to the first and second electrodes are 0, $-V_\pi$, respectively. In this case, due to the loss variation, losses at the first and second optical waveguides are different. Thus, as shown in FIG. 2C, the intensities of the light 31 output from the first optical waveguide 2 and the light 32 output from the second optical waveguide 3 are not equal at the coupling element 6. Therefore, the two lights are not completely interfered when demultiplexed. As a result, some light will be emitted even in the light-OFF state, therefore decreasing the extinction ratio compared with the case of having no loss variation.

On the other hand, when the modulation is conducted by the signal in FIG. 4C to occur the negative chirping, in the light-ON state, voltages $-V_\pi$ are applied to the first and second electrodes. In this case, losses at both optical waveguides are occurred, thereby decreasing the output light as shown by the output waveform 91 in FIG. 5B. Thus, the extinction ratio will be further reduced as compared with the above case.

As explained above, when the loss variation exists, the chirping property must be deteriorated. When a Mach-Zehnder modulator has some loss variation, the output electric field $E_{out}$ of the modulator is represented as below:

$$E_{out} = [E_0\exp(j\omega t)\exp\{\alpha(V_1)+j\Phi(V_1)\} + \qquad (1)$$
$$E_0\exp(j\omega t)\exp\{\alpha(V_2)+j\Phi(V_2)\}]/2$$
$$= [E_0\exp(j\omega t)\exp\{\alpha(V_1)+j\Phi(V_1)\}\{1+\exp(\Delta\alpha+j\Delta\Phi)\}]/2$$
$$= [E_0\exp\{\alpha(V_1)\}\sqrt{\{2\exp(\Delta\alpha)\cosh\Delta\alpha+\cos\Delta\Phi\}} \times$$
$$\exp\{j\Phi(V_1)+j\Phi\} \times \exp(j\omega t)]/2$$

$$\Phi=\tan^{-1}[\exp(\Delta\alpha)\sin\Delta\Phi/\{1+\exp(\Delta\alpha)\cos\Delta\Phi\}],$$
$$\Delta\alpha=\alpha(V_2)-\alpha(V_1), \Delta\Phi=\Phi(V_2)-\Phi(V_1)$$

wherein Eo represents an incidence electric field amplitude into the modulator, ω represents an angular frequency, $V_1, V_2$ represent voltages applied to the first and second electrodes, respectively, $\Phi(V)$ represents a phase variation in the optical waveguide when a voltage V is applied, and $\alpha(V)$ represents a loss variation when a voltage V is applied.

The chirping of modulated waveform is represented as next:

$$df=d[\Phi(V_1)+\tan^{-1}<\exp(\Delta\alpha)\sin\Delta\Phi/\{1+\exp(\Delta\alpha)\cos\Delta\Phi\}>]/dt \ldots \quad (2)$$

In the second item within the square brackets of the equation (2), an excessive chirping due to loss variation is included. Herein, the chirping 82, 92 shown in FIGS. 5A and 5B are occurred in the case of having the loss variation of 2 dB in $V=-V_\pi$.

In FIGS. 5A and 5B, it is understood that the chirping due to loss variation is a negative steep chirping that appears before and after the light-ON. This chirping causes complex changes of the transmission characteristics in an optical fiber. Therefore, when such a modulator, as it is, is applied to a system which is designed for LN modulator having no loss variation, an optimum state thereof cannot be obtained, i.e., the system will require re-designing. Namely, due to the loss variation, the matching with LN modulators now available may be affected.

Furthermore, in the conventional semiconductor optical modulator, the average power of output light may vary depending on the way of applying voltage to each electrode. Herein, the attenuation ratio of an average power of output light compared to that in the case of having no loss variation will be referred to as 'excess loss'. FIG. 7 shows excess losses to the voltage amplitude ratio r shown in FIG. 4A when a mark ratio which means a rate of light-ON occurrence in all signals is ½. According as r increases, the excess loss is increased. Due to this, when adjusting the modulator drive, the variation in output light level may cause the variation in system characteristics to make the adjustment difficult. In particular, in the case of amplifying the modulated light by an optical amplifier, the signal-to-noise ratio of output light may be deteriorated due to the reduction of input light level.

Japanese patent application laid-open No.5-72575 discloses an optical switch, which is not an optical modulator but belongs to Mach-Zehnder-type interference devices, that has a structure to reduce the optical crosstalk.

However, in the optical switch of Japanese patent application No.5-72575, loss variation, with which the present invention concerns, is not considered. Accordingly, it does not teach any solutions to the deterioration of chirping and the excess loss.

SUMMARY OF THE INVENTION

Accordingly, it is an object of the invention to provide a semiconductor optical modulator in which an extinction ratio can be improved even when an optical waveguide in the modulator has a loss variation.

It is a further object of the invention to provide a semiconductor optical modulator in which excess chirping due to the loss variation can be reduced.

According to the invention, a semiconductor optical modulator, comprises:

a semiconductor input-light waveguide with an incidence end;

a semiconductor Y-branch element for branching light from the semiconductor input-light waveguide into two equal lights;

first and second semiconductor optical waveguides for propagating the two lights, respectively branched by the semiconductor Y-branch element;

first and second electrodes provided on the first and second optical waveguides, respectively;

a semiconductor optical coupling element for coupling the two lights passed through the first and second optical waveguides; and a semiconductor output-light waveguide for leading light coupled in the semiconductor optical coupling element to an emission end of the semiconductor output-light waveguide;

wherein the semiconductor optical modulator is provided with a means for producing a phase difference of 180° between the two lights input to the semiconductor optical coupling element when equal voltages are applied to the first and second electrodes.

BRIEF DESCRIPTION OF THE DRAWINGS

The invention will be explained in more detail in conjunction with the appended drawings, wherein.

DESCRIPTION OF THE PREFERRED EMBODIMENTS

Figure 8:
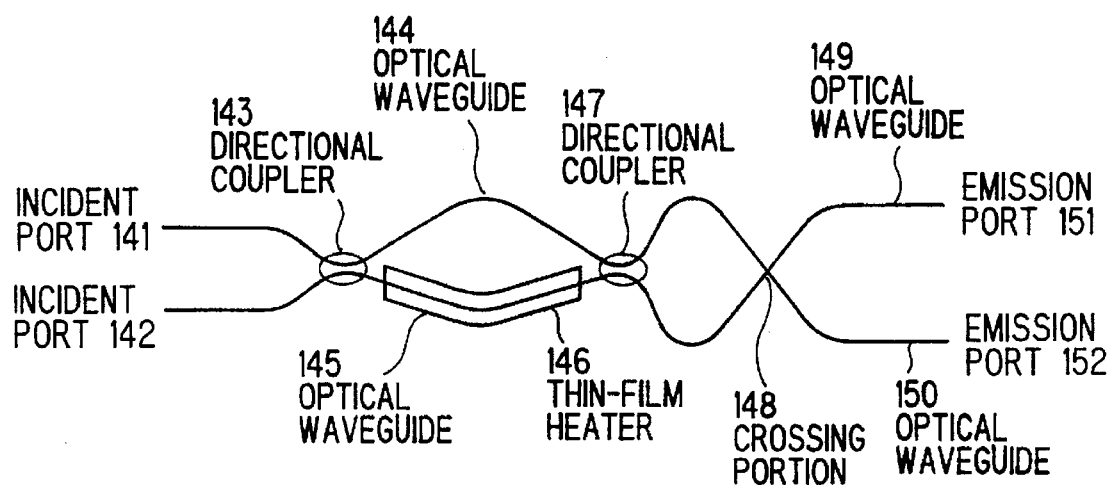
FIG. 8 is a schematic diagram showing the composition of a conventional waveguide-type matrix optical switch.

Before explaining a semiconductor optical modulator in the preferred embodiments, the aforementioned conventional optical switch will be explained in FIG. 8. As shown in FIG. 8, the optical switch has the first and second ports 141, 142 at the incidence end, the third and fourth ports 151, 152 at the emission end and the first and second directional couplers 143, 147 for multiplexing the incident light and for coupling the emitting light, respectively, whereby the optical switching is performed. This device is characterized in that, between the first optical waveguide 144 and the second optical waveguide 145 with a thin-film heater 146, the effective optical path length difference corresponding to a half wavelength of the signal light is provided, and that the third optical waveguide 149 and fourth optical waveguide 150 are crossed at a crossing portion 148. Because of this, the optical crosstalk can be kept low even when the coupling ratios of the directional couplers 143, 147 varies due to the production error or signal wavelengths.

Next, a semiconductor optical modulator in the preferred embodiments according to the invention will be explained.

Figure 1:
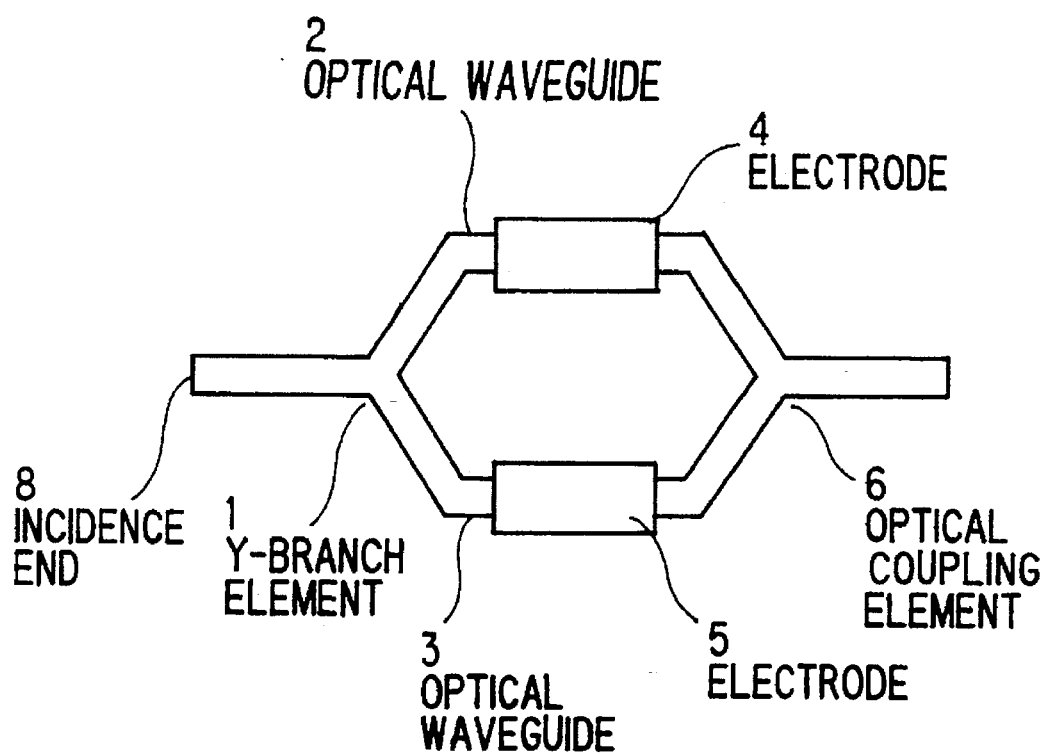
FIG. 1 is a schematic diagram showing the composition of a conventional Mach-Zehnder modulator.
Figure 2A:
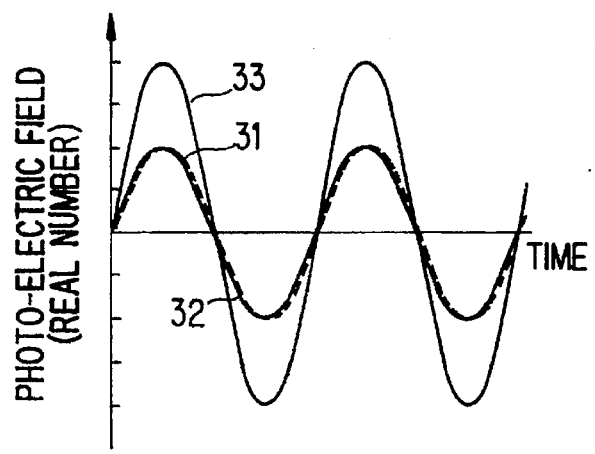
FIGS. 2A to 2C show photo-electric field waveforms of output lights in the conventional Mach-Zehnder modulator.
Figure 2B:
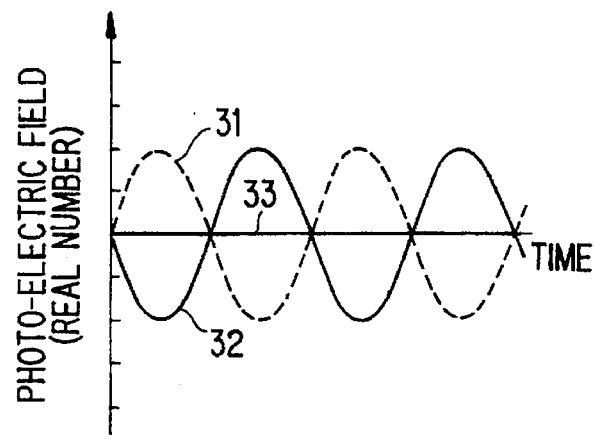
Figure 2C:
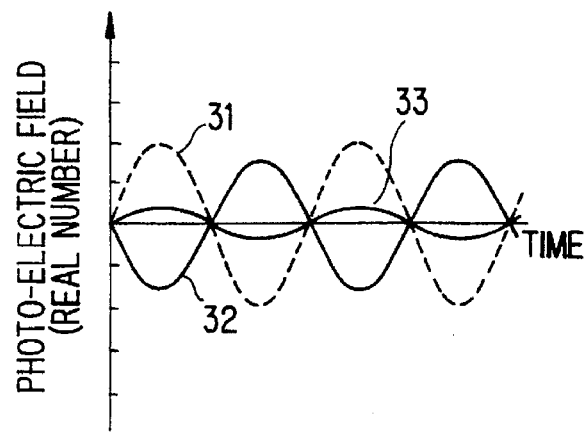
Figure 9:
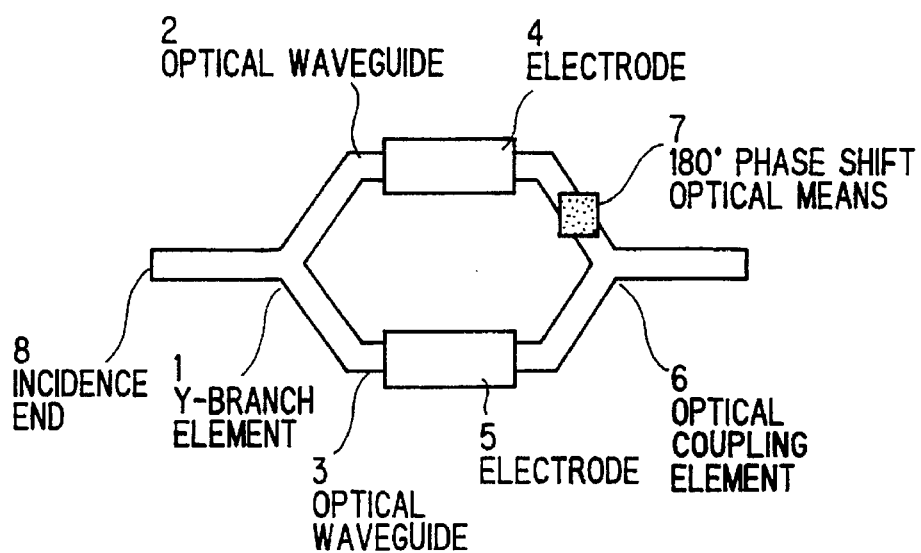
FIG. 9 is a schematic diagram showing the composition of a semiconductor optical modulator of the invention.

FIG. 9, wherein like parts are indicated by like reference numerals as used in FIG. 1, shows a schematic composition of the semiconductor optical modulator of the invention. The optical modulator is formed on a semiconductor substrate, where optical waveguides are formed by semiconductor layers. With reference to FIG. 9, incident light into an incidence end 8 is equally divided into light passing through the first optical waveguide 2 and light passing through the second optical waveguide 3 by a Y-branch element 1. Over the first and second optical waveguides 2, 3, the first and second electrodes 4, 5 are provided, respectively. In the first optical waveguide 2, a 180° phase shift optical means 7 for shifting an optical phase by 180° is inserted. The divided lights are passed through the first and second optical waveguides 2, 3, respectively, thereafter being coupled at an optical coupling element 6, and being output from the modulator.

The 180° phase shift optical means 7 can be designed so that the loss is negligible. Except for the 180° phase shift optical means 7, the optical path lengths of the two optical waveguides are identical. In this modulator, when equal voltages are applied to the first and second electrodes 4, 5, a light-OFF state is obtained. The losses in the first and second optical waveguides 2, 3 including the increment due to loss variation are identical. Thus, the electric field amplitudes of the two lights completely interferes with each other at the optical coupling element 6. Therefore, in the light-OFF state, light is completely extinguished as shown by output light waveforms 111, 113 in FIGS. 10A and 10B. As a result, except for another deteriorating factor, the extinction ratio of modulated light will be infinitely increased.

The chirping of modulated waveform in the Mach-Zehnder modulated will be explained below. Considering some loss variation, the output electric field $E_{out}$ of the modulator is represented as below:

$$\begin{aligned} E_{out} &= [E_0 \exp(j\omega t)\exp\{\alpha(V_1)+j\Phi(V_1)\} - \\ & \quad E_0 \exp(j\omega t)\exp\{\alpha(V_2)+j\Phi(V_2)\}]/2 \\ &= [E_0 \exp(j\omega t)\exp\{\alpha(V_1)+j\Phi(V_1)\}\{1-\exp(\Delta\alpha+j\Delta\Phi)\}]/2 \\ &= [E_0 \exp\{\alpha(V_1)\}\sqrt{\{2\exp(\Delta\alpha)\cosh\Delta\alpha - \cos\Delta\Phi\}} \times \\ & \quad \exp\{j\Phi(V_1)+j\Phi\} \times \exp(j\omega t)]/2 \end{aligned} \quad (3)$$

$\Phi=\tan^{-1}[-\exp(\Delta\alpha)\sin\Delta\Phi/\{1-\exp(\Delta\alpha)\cos\Delta\Phi\}],$ $\Delta\alpha=\alpha(V_2)-\alpha(V_1), \Delta\Phi=\Phi(V_2)-\Phi(V_1)$ wherein each sign represents the same as used in the equation (1).

The chirping of modulated waveform is represented as next:

$$df = d[\Phi(V_1)+\tan^{-1}<-\exp(\Delta\alpha)\sin\Delta\Phi/\{1-\exp(\Delta\alpha)\cos\Delta\Phi\}>]/dt \ldots (4)$$

Figure 3A:
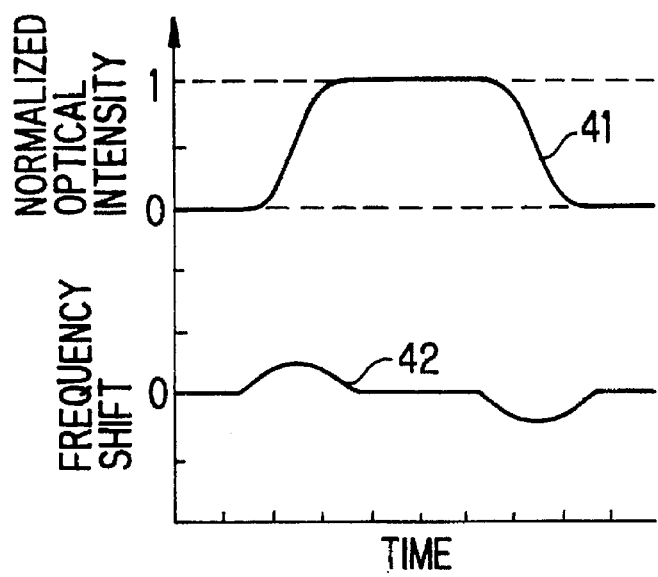
FIGS. 3A and 3B show output light waveforms and chirping in the conventional Mach-Zehnder modulator.
Figure 3B:
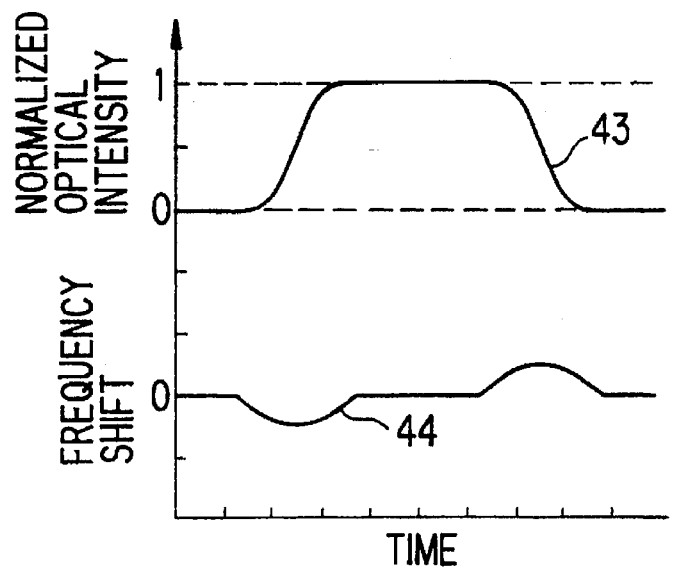
Figure 4A:
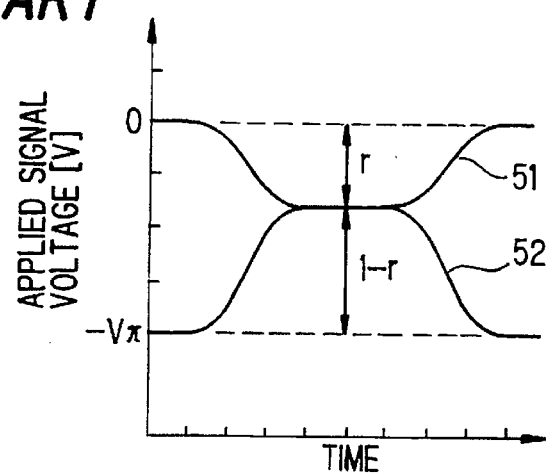
FIGS. 4A to 4C show applied signal voltage waveforms to two electrodes of a Mach-Zehnder modulator.
Figure 4B:
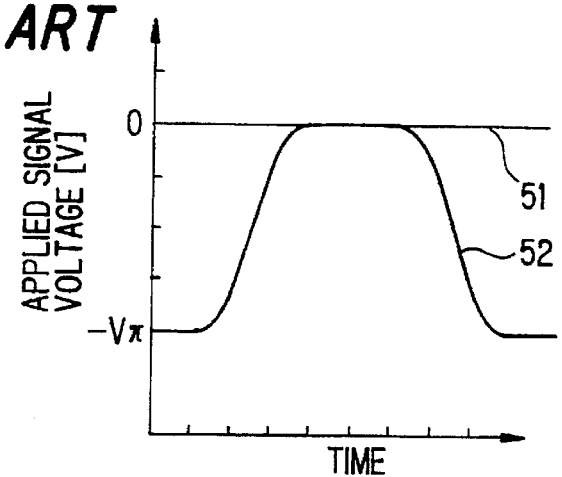
Figure 4C:
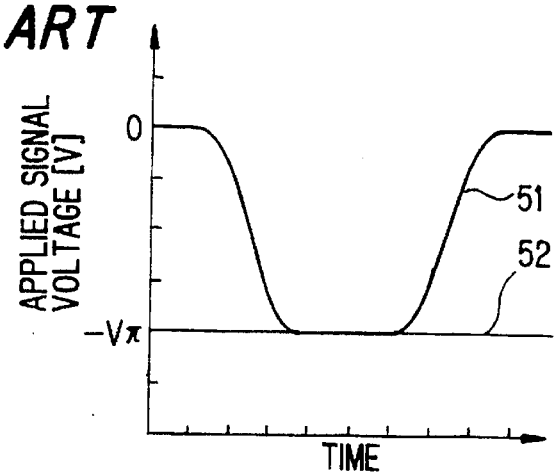
Figure 5A:
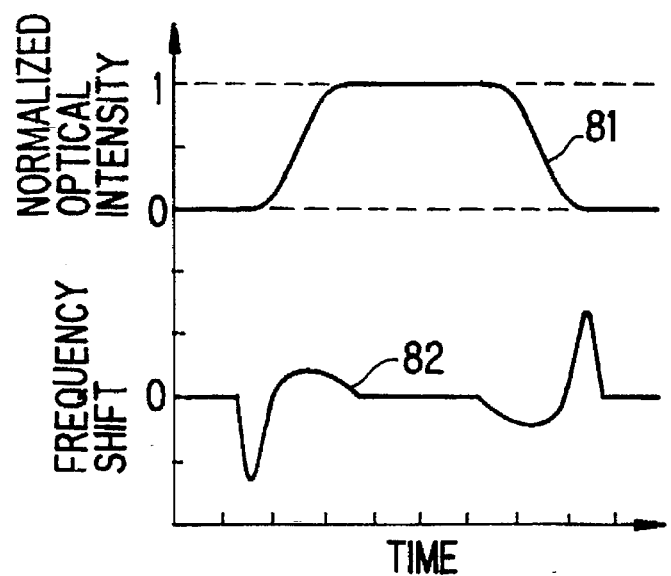
FIGS. 5A and 5B show output light waveforms and chirping in a Mach-Zehnder modulator which has a loss variation.
Figure 5B:
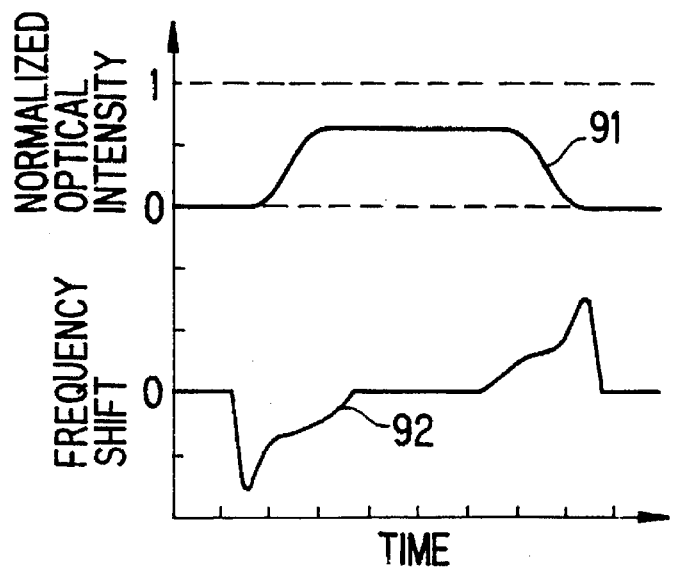
Figure 6:
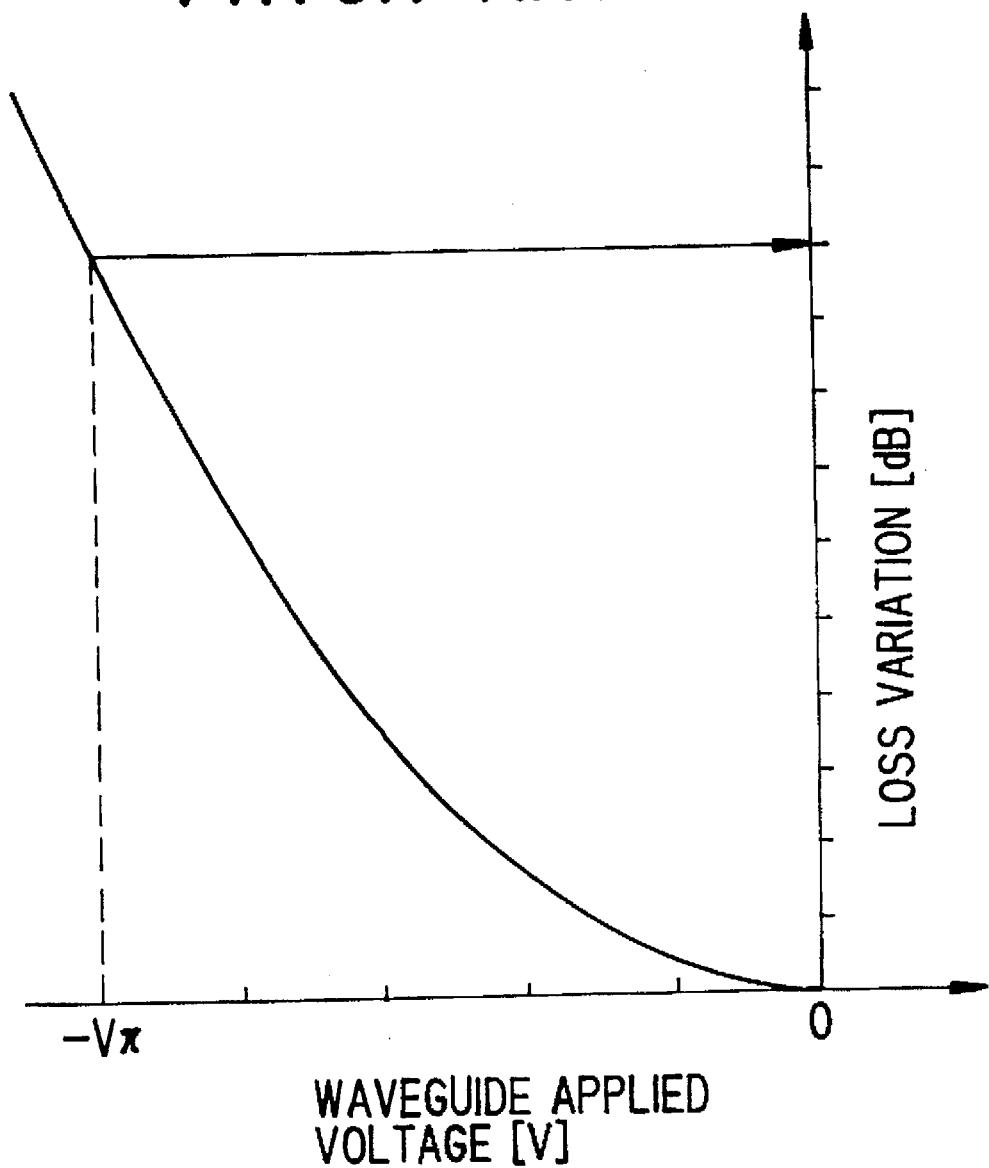
FIG. 6 shows a relationship between waveguide applied voltage and excess variation in a semiconductor optical waveguide.
Figure 7:
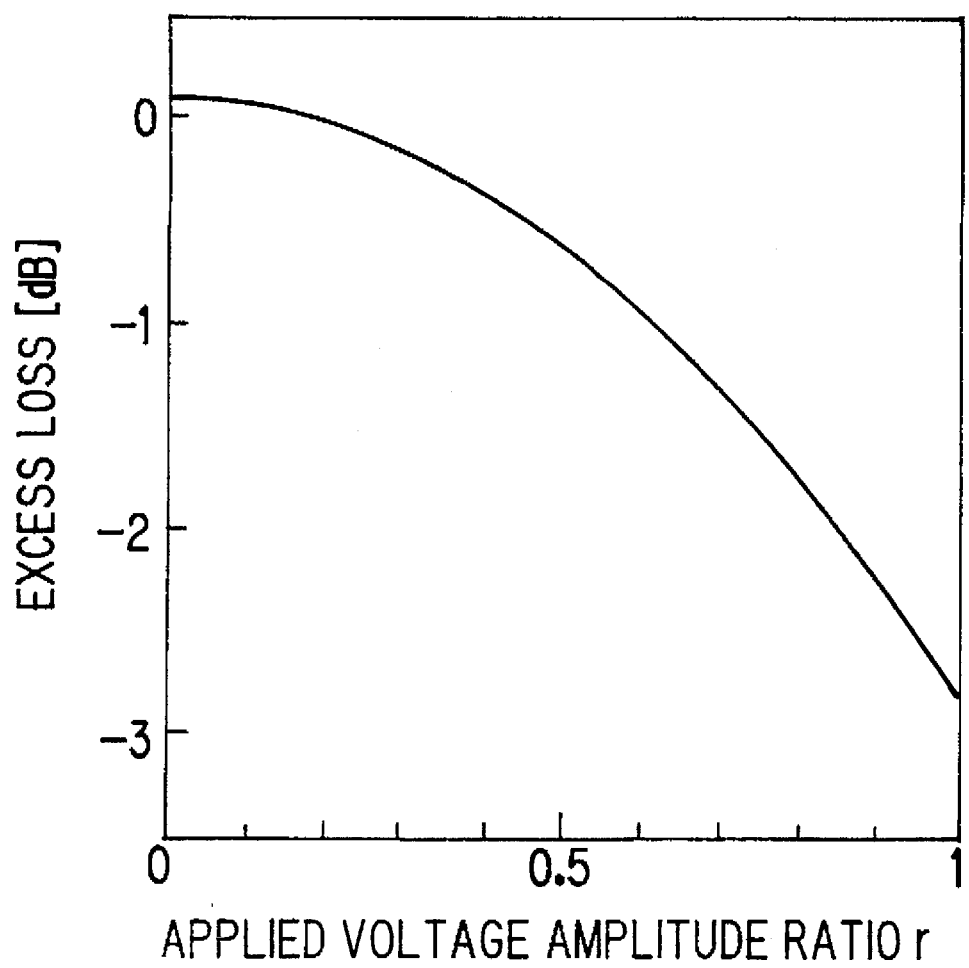
FIG. 7 shows a relationship between applied voltage amplitude ratio and excess loss in a Mach-Zehnder modulator which has a loss variation.
Figure 10A:
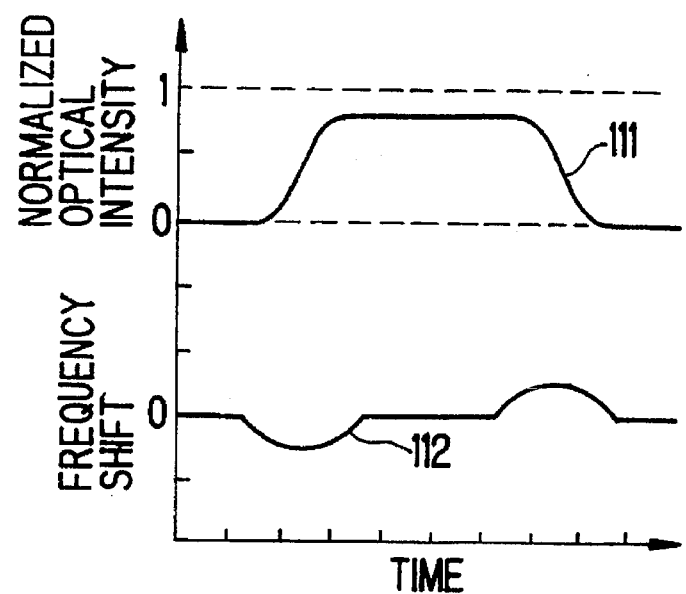
FIGS. 10A and 10B show output light waveforms and chirping in a Mach-Zehnder modulator of the invention.
Figure 10B:
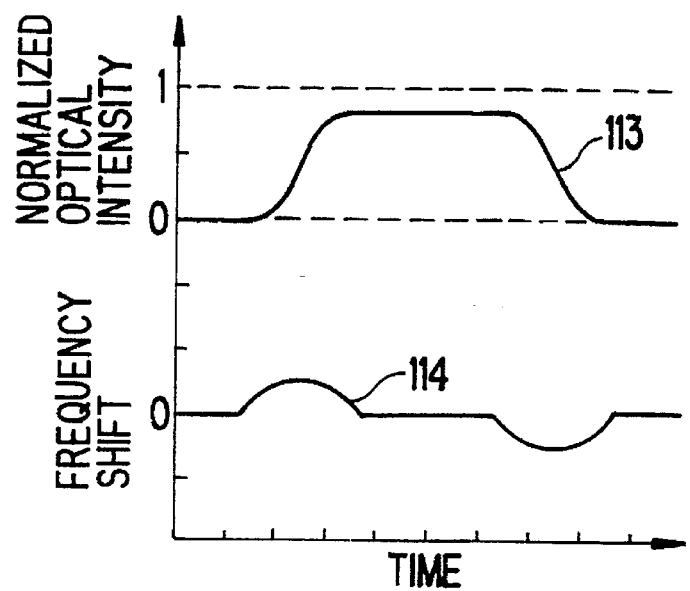

FIGS. 10A and 10B show output light waveforms and chirping when driven by the signals in FIGS. 4B and 4C. Also, in the optical modulator of the invention, an excessive chirping due to loss variation is included in the second item within the square brackets of the equation (4). However, as shown by the calculated chirping 112, 114 in FIGS. 10A and 10B, the excess chirping, which occur near light-ON, are so small (the calculation is conducted in the case of having the loss variation of 2 dB in $V=-V_\pi$). These are almost identical with the chirping 42, 44, as shown in FIGS. 3A and 3B, in the case of having no loss variation.

Next, excess loss in the modulator of the invention will be explained below. In the modulator, the light-ON state is obtained only when voltage of $-V_\pi$ is applied to one of the first and second electrodes and voltage of 0 is applied to the other (because this case brings the maximum light output). Thus, the amount of light in the light-ON state is constant regardless of the applied voltage amplitude ratio r in the light-OFF state. Furthermore, since light is always completely extinguished in the light-OFF state, the amount of output light is zero regardless of the value r. Accordingly, in the modulator of the invention, excess loss due to the way of driving does not occur.

Examples of the 180° phase shift optical means 7 are as follows:

1) to differentiate the lengths of the two semiconductor layers to form the optical waveguides;
2) to differentiate the propagation constants of the optical waveguides by, for example, changing the width of the cladding layer of the two semiconductor layers to form the optical waveguides;
3) to provide one optical waveguide with an electrode for phase shift and to apply a voltage thereto to shift the optical phase by 180°;
4) to produce a temperature difference between two optical waveguides to differentiate the refractive indexes;
5) to insert an optical crystal in one optical waveguide to shift the optical phase by 180°.

Two or more of these means may be combined. In this case, one means may be a main means and another means may be a compensating means for slightly adjusting.

Figure 11:
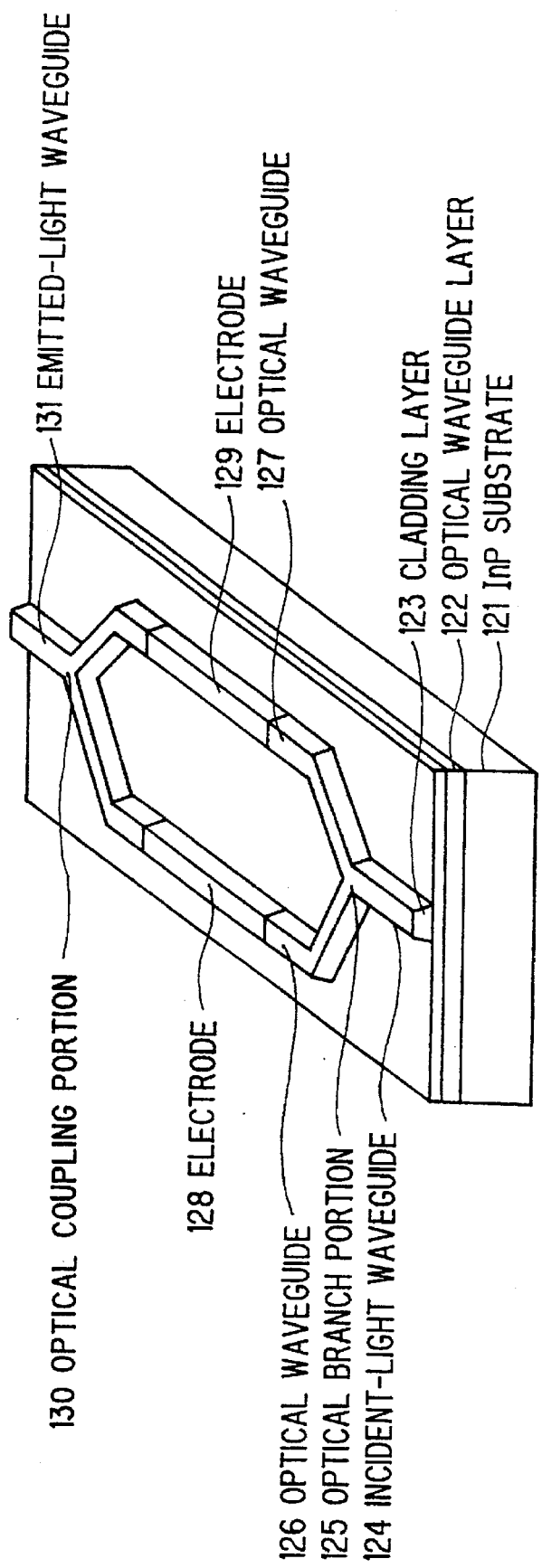
FIG. 11 shows a perspective view showing a semiconductor optical modulator in a first preferred embodiment according to the invention.

With reference to FIG. 11, a semiconductor optical modulator in the first preferred embodiment will be explained.

In the semiconductor optical modulator, an optical waveguide layer 122 is formed on a InP substrate 121, and on the optical waveguide layer 122 a cladding layer 123 is formed. The optical waveguide layer is, for example, a multiple quantum well structured $In_{0.05}Ga_{0.36}As_{0.76}P_{0.24}/$ InP. The cladding layer is, for example, p-InP. The modulator is composed of an incident-light waveguide 124, an optical branching portion 125 for branching the incident light, first and second optical waveguides 126, 127 for waveguiding the two branched lights, respectively, first and second electrodes 128, 129 provided on the first and second optical waveguides, respectively, an optical multiplexing portion 130 for coupling the two lights passed through the first and second optical waveguides, and an emitted-light waveguide 131 for guiding the coupled light to an emission end.

In the Mach-Zehnder modulator, the lengths of the first and second optical waveguides 126, 127 are different by $\Delta L$. $\Delta L$ is calculated by the next equation (5) using a propagation constant $\beta$ determined by the sectional shape and material of optical waveguide and the wavelength of propagating light.

$$\Delta L = (2n+1)\pi/\beta \ldots \quad (5)$$

wherein n is an integer. In this structure, when equal voltages are applied to the first and second electrodes 128, 129, the phase difference between the two lights at the optical coupling portion 130 becomes 180°. Here, if n in the equation (5) is zero to shorten $\Delta L$, the loss difference between the first and second optical waveguides can be so decreased, therefore giving a high extinction ratio.

Figure 12:
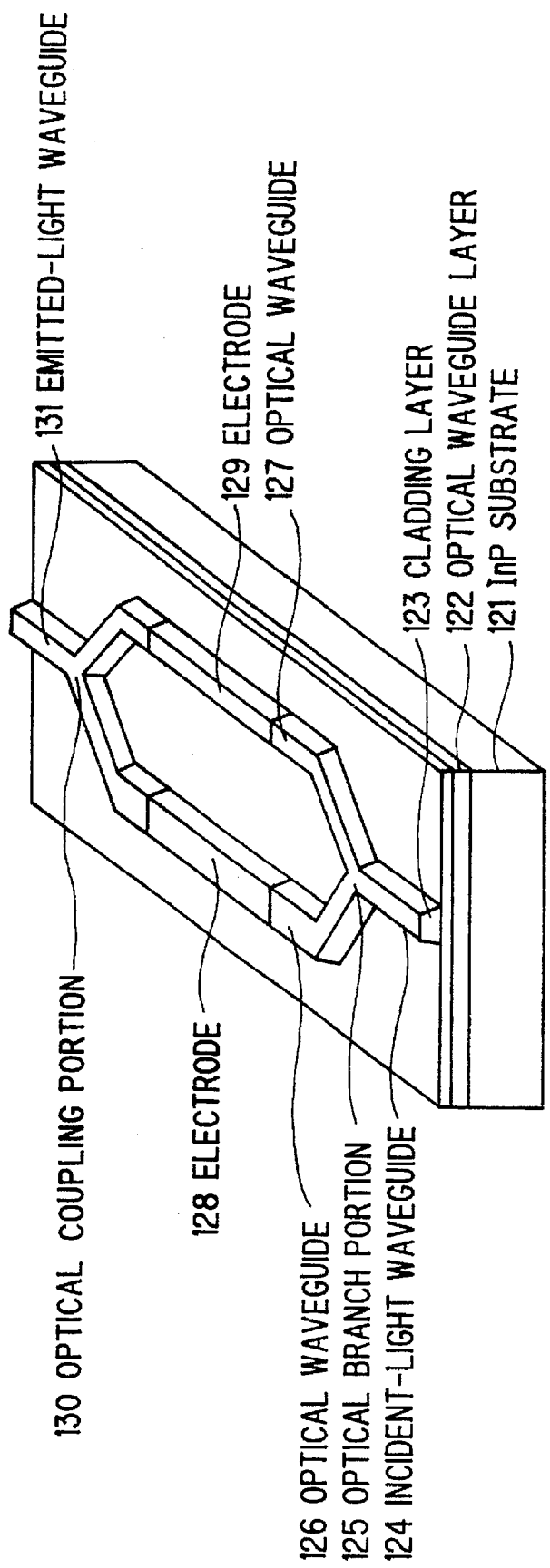
FIG. 12 shows a perspective view showing a semiconductor optical modulator in a second preferred embodiment according to the invention.

With reference to FIG. 12, a semiconductor optical modulator in the second preferred embodiment will be explained.

The second embodiment is characterized in that the first embodiment is altered so that the lengths of the first and second optical waveguides 126, 127 are equal and the widths of the cladding layers composing the two optical waveguides, respectively are different. When the light propagation constants of the first and second optical waveguides 126, 127 are $\beta_1$, $\beta_2$, respectively, if the two constants are set to satisfy the next equation:

$$|\beta_1 - \beta_2| = (2n+1)\pi/L \ldots \quad (6)$$

wherein L represents the length of the first and second optical waveguides, the phase difference between the two lights at the optical coupling portion 130 becomes 180°, i.e., the same effect as in the first embodiment can be obtained.

In this embodiment, if the coupling of the optical branching portion 125 and each of the optical waveguides is completed with low loss, the loss difference between the first and second optical waveguides can be so decreased, therefore giving a high extinction ratio.

The second embodiment may be altered as next. Namely, both the lengths and widths of the two optical waveguides may be differentiated so that the phase difference between the two lights at the optical coupling portion 130 becomes 180°. In this case, to satisfy the next equation (7) is required.

$$|\beta_1 L_1 - \beta_2 L_2| = (2n+1)\pi \ldots \quad (7)$$

wherein $L_1$, $L_2$ represent the lengths of the first and second optical waveguides 126, 127, respectively, and $\beta_1$, $\beta_2$ represent the propagation constants of the first and second optical waveguides 126, 127, respectively.

Figure 13:
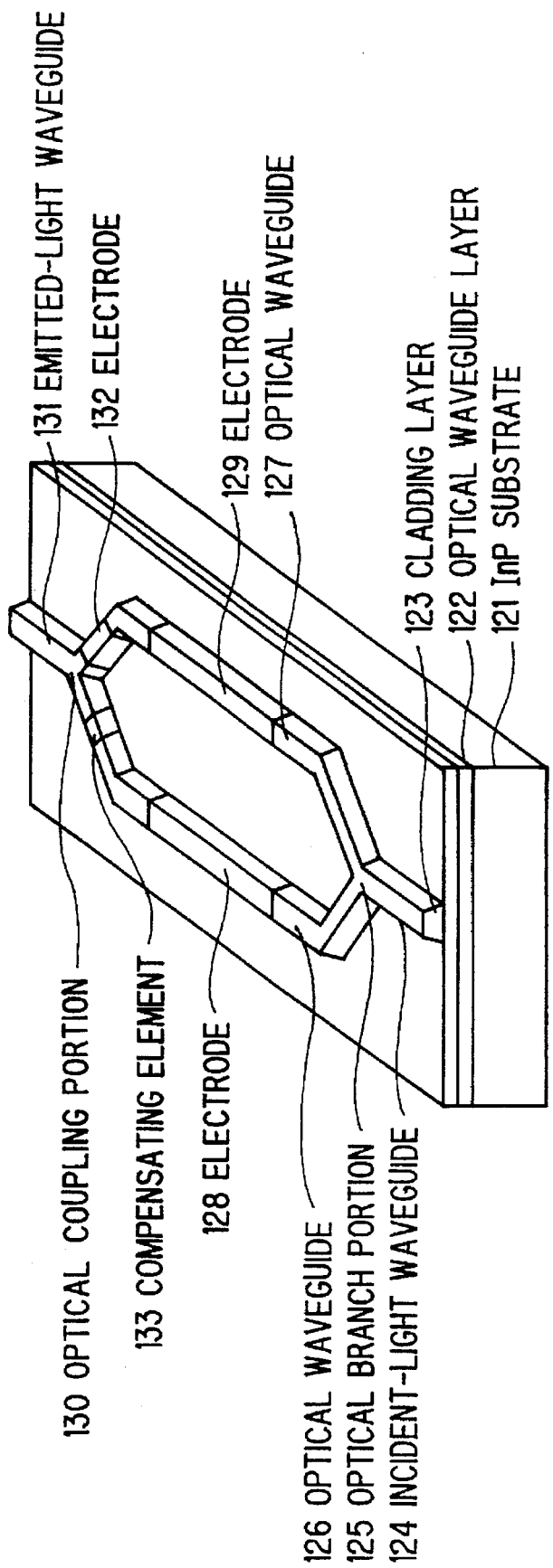
FIG. 13 shows a perspective view showing a semiconductor optical modulator in a third preferred embodiment according to the invention.

With reference to FIG. 13, a semiconductor optical modulator in the third preferred embodiment will be explained.

In the third embodiment, a direct-current voltage is applied to an electrode provided other than electrodes for applying a modulating signal voltage, thereby changing the phase of the light which propagates through one of optical waveguides. Namely, a third electrode 132 other than electrodes 128, 129 is provided on an optical waveguide 127 and the direct-current voltage is applied to the third electrode 132 to shift 180° of the optical phase. Therefore, when equal voltages are applied to the first and second electrodes 128, 129, the light-OFF state can be brought to provide the high extinction ratio.

Herein, if the third electrode 132 causes big loss variation when a voltage is applied to it, it is difficult to get the complete extinction of light. To solve this problem, a compensating element 133 for producing a light loss can be provided on the other optical waveguide 126.

Meanwhile, in the first and second embodiments in FIGS. 11 and 12, the lengths and widths of the optical waveguides 126, 127 have to be severely controlled to satisfy the requirements under the equations (5), (6) and (7) when they are fabricated. Therefore, it may be difficult to enhance the production yield. To solve this problem, the third electrode in the third embodiment can be also employed to compensate the phase variation shifted from the optimum value. Here, if a phase variation compensated by the third electrode is sufficiently small, the loss variation thereof is negligible and does not negatively affect the extinction ratio.

Figure 14:
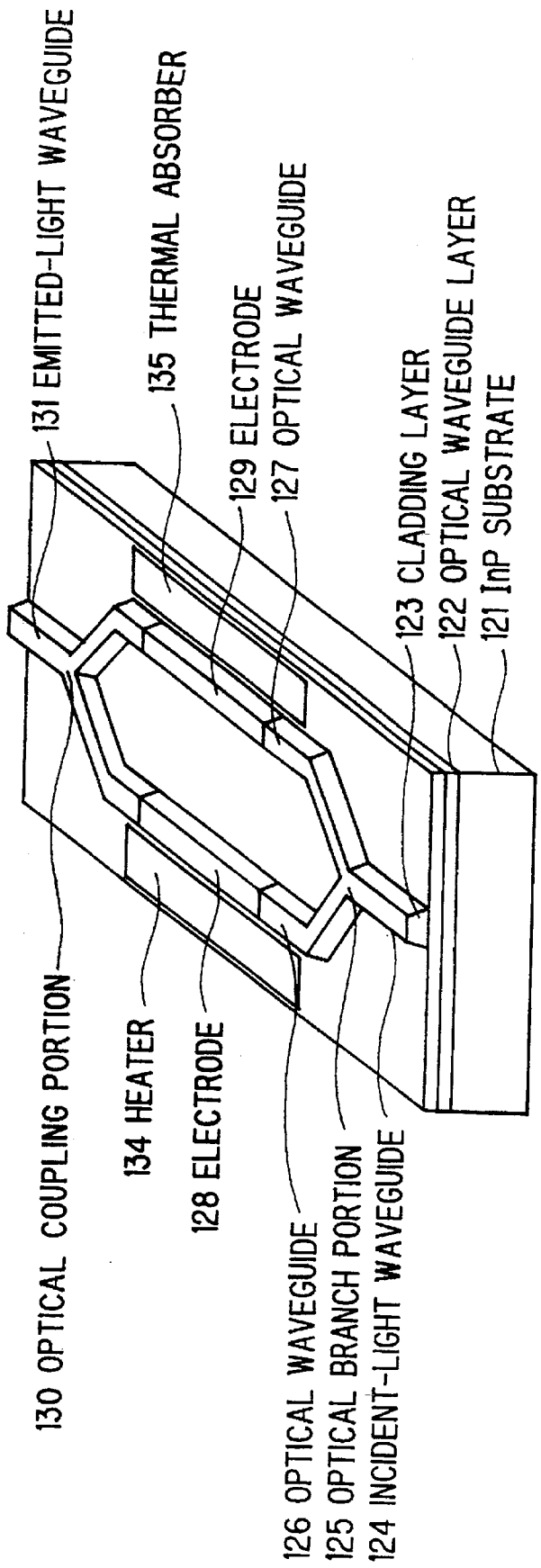
FIG. 14 shows a perspective view showing a semiconductor optical modulator in a fourth preferred embodiment according to the invention.

With reference to FIG. 14, a semiconductor optical modulator in the fourth preferred embodiment will be explained.

In the fourth embodiment, a temperature difference between two optical waveguides 126, 127 is given to differentiate the refractive indexes of the optical waveguides to produce the phase difference therebetween. Namely, a small heater 134 is provided near the first optical waveguide 126 and a thermal absorber 135 is provided near the second optical waveguide 127. Thus, the refractive indexes of waveguiding layers of the two optical waveguides can be slightly varied to produce a phase difference of 180° between the lights propagating through the two optical waveguides.

Similarly to the third embodiment, the fourth embodiment can be applicable to the compensation when the phase difference between the two optical waveguides is shifted from 180° in the first and second embodiments. Here, to produce the phase difference, the voltage control in the third embodiment may have a stability superior to the temperature control in the fourth embodiment since the latter control is relatively complex.

Figure 15:
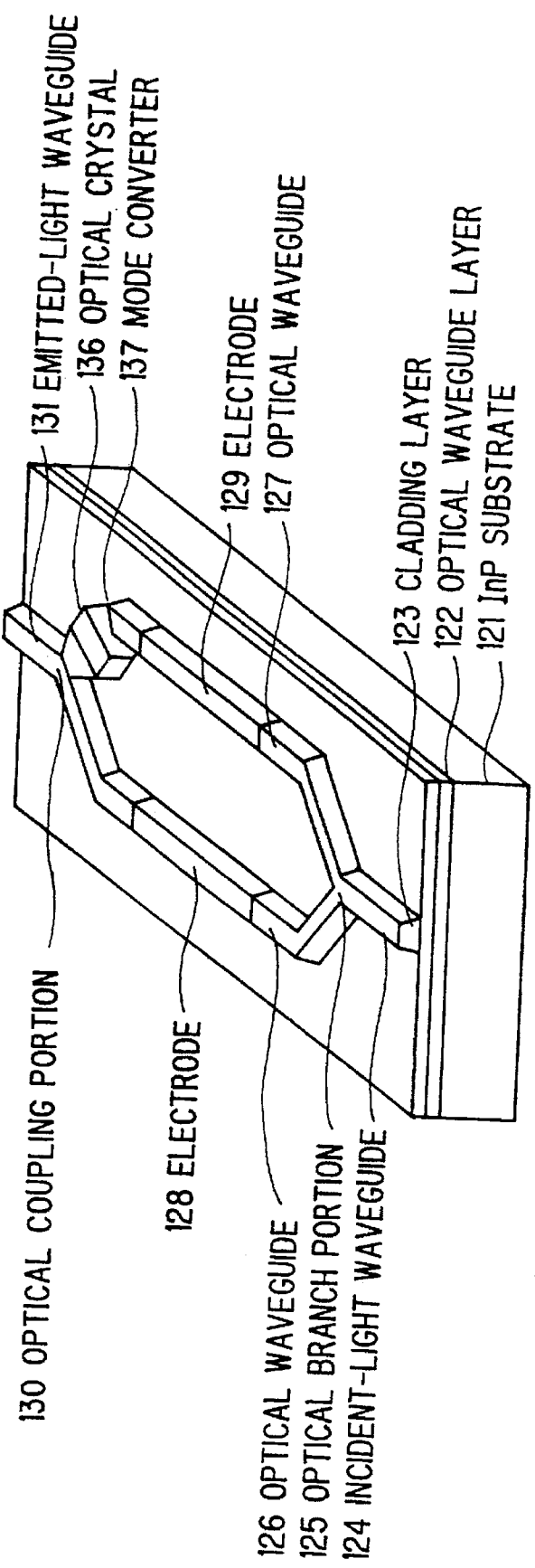
FIG. 15 shows a perspective view showing a semiconductor optical modulator in a fifth preferred embodiment according to the invention.

With reference to FIG. 15, a semiconductor optical modulator in the fifth preferred embodiment will be explained.

In the fifth embodiment, an optical crystal 136 with a very high refractive index is provided on an optical waveguide 127 to produce a phase difference of 180° between two optical waveguides 126, 127. On both ends of the optical crystal 136, mode converters 137 are provided to reduce the connection loss between the optical crystal 136 and the optical waveguide 127. In place of the optical crystal 136, a dopant may be doped into the active layer of the optical waveguide to partially increase the refractive index thereby getting the same advantage as the optical crystal.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A semiconductor optical modulator, comprising:
   a semiconductor input-light waveguide with an incidence end;
   a semiconductor Y-branch element for branching light from said semiconductor input-light waveguide into two equal lights;

first and second semiconductor optical waveguides for propagating said two lights, respectively branched by said semiconductor Y-branch element;

first and second electrodes provided on said first and second optical waveguides, respectively;

a semiconductor optical coupling element for coupling said two lights passed through said first and second optical waveguides; and a semiconductor output-light waveguide for leading light coupled in said semiconductor optical coupling element to an emission end of said semiconductor output-light waveguide;

wherein said semiconductor optical modulator is provided with a means for producing a phase difference of 180° between said two lights input to said semiconductor optical coupling element when equal voltages are applied to said first and second electrodes.

2. A semiconductor optical modulator, according to claim 1, wherein:

said 180° phase difference producing means is composed of said first and second semiconductor optical waveguides with different lengths and/or different sectional structures.

3. A semiconductor optical modulator, according to claim 2, further comprises:

a compensating element for slightly adjusting said phase difference between said two lights to be 180°.

4. A semiconductor optical modulator, according to claim 3, wherein:

said compensating element is a third electrode provided on said first or second optical waveguide to give an optical phase variation when a voltage is applied.

5. A semiconductor optical modulator, according to claim 3, wherein:

said compensating element is a thermal controller which controls to differentiate temperatures of said first and second optical waveguides to give different refractive indexes therebetween.

6. A semiconductor optical modulator, according to claim 1, wherein:

said 180° phase difference producing means is a third electrode which is provided on said first or second optical waveguide, said third electrode giving an optical phase shift of 180° when a voltage is applied.

7. A semiconductor optical modulator, according to claim 1, wherein:

said 180° phase difference producing means is a thermal controller which is provided near at least one of said first and second optical waveguides and controls to differentiate temperatures of said first and second optical waveguides.

8. A semiconductor optical modulator, according to claim 1, wherein:

said 180° phase difference producing means is an optical crystal which is provided on said first or second optical waveguide.

9. A semiconductor optical modulator, according to claim 1, wherein:

said 180° phase difference producing means is composed of said first or second optical waveguide into which a dopant is doped into to partially increase the refractive index of said first or second optical waveguide.

* * * * *